(12) United States Patent
Fukui et al.

(10) Patent No.: US 8,053,523 B2
(45) Date of Patent: Nov. 8, 2011

(54) HYDROGEN TANK LINER MATERIAL AND HYDROGEN TANK LINER

(75) Inventors: Yasuharu Fukui, Ube (JP); Tsutomu Katayama, Ube (JP); Motohiro Mizuno, Toyota (JP)

(73) Assignees: Ube Industries, Ltd. (JP); Toyota Jidosha Kabushiki Kaisha (JP)

(*) Notice: Subject to any disclaimer, the term of this patent is extended or adjusted under 35 U.S.C. 154(b) by 336 days.

(21) Appl. No.: 12/369,773

(22) Filed: Feb. 12, 2009

(65) Prior Publication Data

US 2009/0203845 A1 Aug. 13, 2009

(30) Foreign Application Priority Data

Feb. 12, 2008 (JP) ................. 2008-030755

(51) Int. Cl.
*C08L 77/00* (2006.01)
*B23K 26/00* (2006.01)

(52) U.S. Cl. ............ 525/66; 525/178; 525/183; 206/0.6

(58) Field of Classification Search ................... 206/0.6; 220/560.11; 525/66, 178, 183

See application file for complete search history.

(56) References Cited

U.S. PATENT DOCUMENTS

| 5,030,689 A * | 7/1991 | Plachetta et al. ............. 525/66 |
| 5,064,700 A * | 11/1991 | Yasue et al. ................ 428/36.92 |
| 2001/0041770 A1 * | 11/2001 | Di-Benedetto et al. ......... 525/66 |
| 2002/0088806 A1 | 7/2002 | Takaku et al. |

FOREIGN PATENT DOCUMENTS

| EP | 1228 862 A1 | 8/2002 |
| JP | 40239559 A | 8/1992 |
| JP | 2002-188794 A | 7/2002 |
| JP | 2003-56702 A | 2/2003 |
| JP | 2004-176898 A | 6/2004 |
| JP | 2004-521171 A | 7/2004 |
| JP | 2007-223087 | 9/2007 |
| WO | 01/53415 A1 | 7/2001 |

* cited by examiner

*Primary Examiner* — Jeffrey Mullis
(74) *Attorney, Agent, or Firm* — DLA Piper LLP (US)

(57) ABSTRACT

A hydrogen tank liner material comprises a polyamide resin composition which comprises (A) a polyamide resin at 85-40 wt %, (B) a copolyamide at 5-30 wt % and (C) an impact-resistant material at 10-30 wt % with respect to the total weight of the polyamide resin composition. Preferably, the (B) copolyamide is PA6/66 and the (C) impact-resistant material is an acid-modified ethylene/α-olefin-based copolymer. A hydrogen tank liner material with excellent gas barrier properties and superior impact resistance even at low temperatures is obtained.

13 Claims, 1 Drawing Sheet

HYDROGEN TANK LINER MATERIAL AND HYDROGEN TANK LINER

DESCRIPTION OF RELATED APPLICATION

This application claims the priority based on Japanese Patent Application No. 2008-030755, filed at the Japan Patent Office on Feb. 12, 2008, which disclosure is incorporated herein by reference.

TECHNICAL FIELD

The present invention relates to a hydrogen tank liner material, and more specifically it relates to a hydrogen tank liner material with excellent gas barrier properties and with excellent impact resistance even at cryogenic temperatures of −40° C. and below, as well as to a hydrogen tank liner produced using it.

BACKGROUND ART

Fuel cell electric vehicles have become the object of increasing attention in recent years from the viewpoint of environmental concerns, such as reducing carbon dioxide emissions that are a cause of global warming. Fuel cell electric vehicles are furnished with fuel cells that generate electrical power by electrochemical reaction of hydrogen with oxygen in the air, and the electricity generated by the fuel cells is supplied to a motor to produce driving force. Such fuel cell electric vehicles are also provided with hydrogen tanks which are easier managed than liquid hydrogen. Hydrogen vehicles have been another focus of attention from an environmental viewpoint, as automobiles that have combustion engines but use hydrogen as fuel instead of gasoline, and such hydrogen vehicles are also provided with hydrogen tanks for the same reason.

The hydrogen tanks used in fuel cell electric vehicles and hydrogen vehicles are high-pressure hydrogen storage containers with barrel-shaped exteriors, which consist of a metal or resin inner layer (liner) that directly contacts with the hydrogen gas, and a fiber-reinforced resin layer laminated on the outer surface (see Japanese Unexamined Patent Publication (Kokai) Nos. 2002-188794 and 2004-176898)

However, when a metal such as aluminum is used as the hydrogen tank liner, it exhibits excellent gas barrier properties but also absorbs hydrogen, leading to brittle fracture at low temperatures. When high-density polyethylene is used, sealability is exhibited for relatively high molecular weight natural gas but the gas barrier property for low molecular weight hydrogen is poor.

The use of polyamide resins that have more excellent gas barrier properties than high-density polyethylene has been proposed for hydrogen tank liner materials.

Incidentally, hydrogen tank liner materials must have high impact resistance because strong impact during use of hydrogen tank liners can cause cracking and lead to gas leakage, and improved impact resistance has been achieved by adding impact-resistant materials to polyamide resins.

However, when the internal pressure of a hydrogen tank is set to a high pressure of 70 MPa with an aim toward lengthening travel distance, the hydrogen tank must be at quite a low temperature during high-speed travel, and hence excellent impact resistance must be exhibited even at cryogenic temperatures of −40° C. and below.

It is an object of the present invention to solve the aforementioned problems by providing a hydrogen tank liner material with excellent gas barrier properties and with excellent impact resistance even at cryogenic temperatures of −40° C. and below, as well as to a hydrogen tank liner produced using it.

SUMMARY OF INVENTION

The present inventors have discovered that a hydrogen tank liner material with excellent gas barrier properties and excellent impact resistance at cryogenic temperatures of −40° C. and below can be obtained by combining polyamide 6 with a copolyamide and an impact-resistant material, and the invention has been completed upon this discovery.

Specifically, the invention relates to a hydrogen tank liner material characterized by comprising a polyamide resin composition that contains (A) polyamide 6, (B) a copolyamide and (C) an impact-resistant material.

The invention also provides a hydrogen tank liner obtained by using the hydrogen tank liner material and a method of producing a hydrogen tank liner by using the hydrogen tank liner material.

Since the hydrogen tank liner material of the invention has excellent gas barrier properties and excellent impact resistance at cryogenic temperatures of −40° C. and below, while also allowing laser welding and production of monolayer molded articles by injection molding, it can be suitably used for hydrogen tank liners.

PREFERRED MODES FOR CARRYING OUT THE INVENTION

Figure 1:
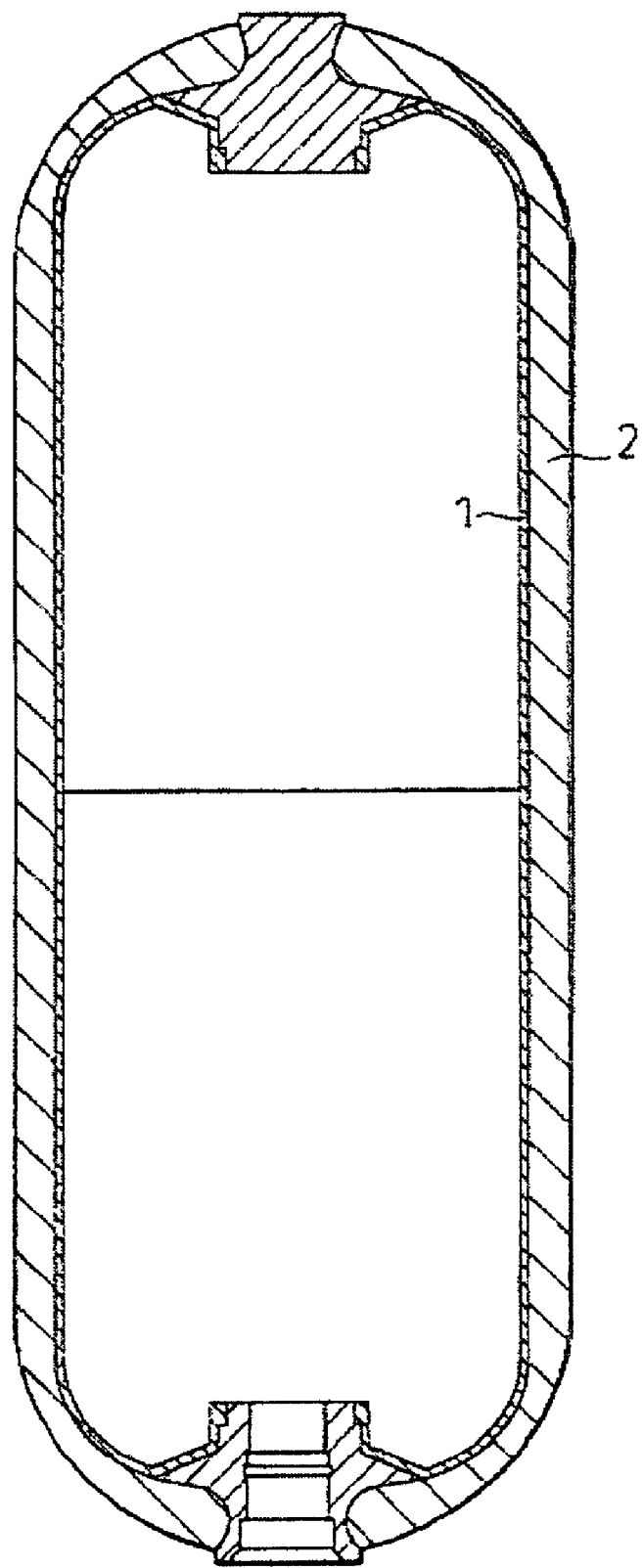
FIG. 1 shows a cross section of a hydrogen tank liner.

A laser welding material according to the invention comprises a polyamide resin composition that contains (A) polyamide 6, (B) a copolyamide and (C) an impact-resistant material.

The (A) polyamide 6 used for the invention is typically a polyamide represented by the formula $(-CO-(CH_2)_5-NH-)_n$ which contains an acid amide bond ($-CONH-$), and it can be obtained by polymerizing ε-caprolactam or 6-aminocaproic acid.

There are no particular restrictions on the polymerization degree of the (A) polyamide 6 according to the invention, but the relative viscosity is preferably 1.5-5.0 and more preferably 2.0-4.5 as measured according to JIS K6920 at 1% concentration in 96% sulfuric acid and a temperature of 25° C. The relative viscosity is preferably below the numerical value of the aforementioned upper limit for more excellent workability, and above the aforementioned lower limit for improved mechanical strength.

The (B) copolyamide used for the invention is a copolyamide containing two or more units derived from an aminocarboxylic acid, a lactam or a diamine and a dicarboxylic acid. Specifically, there may be mentioned copolyamide comprising 2 or more units derived from a C6-12 lactam, a C6-12 aminocarboxylic acid or a combination of a C3-22 dicarboxylic acid and a C2-20 diamine.

As C6-12 aminocarboxylic acids there may be used 6-aminocaproic acid, 7-aminoheptanoic acid, 8-aminooctanoic acid, 9-aminononanoic acid, 10-aminocapric acid, 11-aminoundecanoic acid, 12-aminododecanoic acid and the like.

As C6-12 lactams there may be used ε-caprolactam, ω-enantholactam, ω-undecanelactam, ω-dodecalactam and the like.

As diamines and dicarboxylic acids there may be used liner diamines and liner dicarboxylic acids, and for reduced crystallinity there may be used copolyamides obtained by replacing a portion of a polyamide starting material derived from a liner diamine and a liner dicarboxylic acid, with a diamine and/or dicarboxylic acid having a branched structure.

As liner aliphatic dicarboxylic acids there may be used malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid and the like.

As liner aliphatic diamines there may be used ethylenediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eico-sanediamine and the like.

As branched aliphatic diamines there may be used 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,2-dimethyl-1,6-hexanediamine, 2,5-dimethyl-1,6-hexanediamine, 2,4-dimethyl-1,6-hexanediamine, 3,3-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine and the like.

As branched aliphatic dicarboxylic acids there may be used dimethylmalonic acid, 3,3-diethylsuccinic acid, 2,2-dimethylglutaric acid, 2-methyladipic acid, 3-methyladipic acid, trimethyladipic acid, 2-butylsuberic acid (also referred to as 1,6-decanedicarboxylic acid), 2,3-dibutylbutanedionic acid, 8-ethyloctadecanedionic acid, 8,13-dimethyleicosadionic acid, 2-octylundecanedionic acid, 2-nonyldecanedionic acid and the like.

The (B) copolyamide used for the invention may be a two-component copolyamide composed of two components derived from the aforementioned starting materials, or a copolyamide composed of three or more components. As preferred compounds for the (B) copolyamide there may be mentioned PA6/66 (polyamide 6/66), PA6/12 (polyamide 6/12) and PA6/66/12 (polyamide 6/66/12 terpolymer), among which PA6/66 (polyamide 6/66) is particularly preferred.

The content of the (B) copolyamide is preferably 5-30 wt % with respect to the total polyamide resin composition. A content of 5 wt % or greater will notably improve the impact resistance, while a content of no greater than 30 wt % is preferred for improved rigidity, an increased crystallization rate and better molding workability.

The polyamide resin composition of the invention may also contain a polyamide resin other than the (A) polyamide 6 and (B) copolyamide, or another polymer resin. As other polyamide resins to be included there may be mentioned polyamide 11, polyamide 12, polyamide 66, polyamide 610, polyamide 612, polyamide 1212 and the like. Examples of other polymer resins include polyethylene, polypropylene, ABS resin, polyphenylene oxide, polycarbonate, polyethylene terephthalate, polybutylene terephthalate and the like. When other such polymer resins are added to the mixture, their content in the polyamide resin composition is preferably no greater than 40 wt %.

As materials for the (C) impact-resistant material used for the invention there may be mentioned (ethylene and/or propylene)/α-olefin-based copolymers, (ethylene and/or propylene)/(α,β-unsaturated carboxylic acid and/or unsaturated carboxylic acid ester)-based copolymers, ionomer polymers and aromatic vinyl compound/conjugated diene compound-based block copolymers, any of which may be used alone or in combinations of two or more. Ethylene/α-olefin-based copolymers are preferred.

The (ethylene and/or propylene)/α-olefin-based copolymers are copolymers obtained by copolymerizing ethylene and/or propylene with C3 or greater α-olefins, and as C3 or greater α-olefins there may be mentioned propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and the like. These may be used either alone or in combinations of two or more.

Polyenes of non-conjugated dienes such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornane, 5-ethylidene-2-norbornane, 5-methylene-2-norbornane, 5-isopropylidene-2-norbornane, 6-chloromethyl-5-isopropenyl-2-norbornane, 2,3-diisopropylidene-5-norbornane, 2-ethylidene-3-isopropylidene-5-norbornane and 2-propenyl-2,5-norbornadiene may also be copolymerized therewith. They may be used either alone or in combinations of two or more.

The aforementioned (ethylene and/or propylene)/(α,β-unsaturated carboxylic acid and/or unsaturated carboxylic acid ester)-based copolymers are copolymers obtained by copolymerizing ethylene and/or propylene with α,β-unsaturated carboxylic acid and/or unsaturated carboxylic acid ester monomers, and as α,β-unsaturated carboxylic acid monomers there may be mentioned acrylic acid and methacrylic acid, while as α,β-unsaturated carboxylic acid ester monomers there may be mentioned methyl esters, ethyl esters, propyl esters, butyl esters, pentyl esters, hexyl esters, heptyl esters, octyl esters, nonyl esters and decyl esters of such unsaturated carboxylic acids. These may also be used either alone or in combinations of two or more.

The ionomer polymers mentioned above are olefin and α,β-unsaturated carboxylic acid copolymers of which at least a portion of the carboxyl groups are ionized by neutralization by a metal ion. Ethylene is preferably used as the olefin and-acrylic acid or methacrylic acid is preferably used as the α,β-unsaturated carboxylic acid, but there is no limitation to these examples and unsaturated carboxylic acid ester monomers may also be copolymerized. The metal ion may be an alkali metal or alkaline earth metal such as Li, Na, K, Mg, Ca, Sr or Ba, or it may be Al, Sn, Sb, Ti, Mn, Fe, Ni, Cu, Zn, Cd or the like. These may be used either alone or in combinations of two or more.

The aromatic vinyl compound/conjugated diene compound-based block copolymer is a block copolymer composed of aromatic vinyl compound-based polymer blocks and conjugated diene compound-based polymer blocks, and block copolymers with at least one aromatic vinyl compound-based polymer block and at least one conjugated diene compound-based polymer block may be used. The unsaturated bond in the conjugated diene compound-based polymer block of the block copolymer may be hydrogenated.

The aromatic vinyl compound-based polymer block is a polymer block composed mainly of a structural unit derived from an aromatic vinyl compound. As such aromatic vinyl compounds there may be mentioned styrene, α-methylstyrene, o-methylstyrene, m-methylstyrene, p-methylstyrene, 1,5-dimethylstyrene, 2,4-dimethylstyrene, vinylnaphthalene, vinyl-anthracene, 4-propylstyrene, 4-cyclohexylstyrene, 4-dodecylstyrene, 2-ethyl-4-benzylstyrene, 4-(phenylbutyl)styrene and the like, any of which may be used alone or in combinations of two or more. The aromatic vinyl compound-based polymer block may also in some cases contain a small proportion of a structural unit composed of another unsaturated monomer.

The conjugated diene compound-based polymer block is a polymer block formed from one or more conjugated diene compounds such as 1,3-butadiene, chloroprene, isoprene, 2,3-dimethyl-1,3-butadiene, 1,3-pentadiene, 4-methyl-1,3-pentadiene or 1,3-hexadiene, and in hydrogenated aromatic vinyl compound/conjugated diene compound-based block copolymers, all or some of the unsaturated bond portions of the conjugated diene compound-based polymer block are converted to saturated bonds by hydrogenation.

The molecular structure of an aromatic vinyl compound/conjugated diene compound-based block copolymer or its hydrogenated form may be liner, branched, radial or any desired combination thereof. Among these aromatic vinyl compound/conjugated diene compound-based block copolymers and/or their hydrogenated forms there are preferred one or more diblock copolymers having one aromatic vinyl compound-based polymer block linearity linked to one conjugated diene compound-based polymer block, triblock copolymers having three polymer blocks linearity linked in the order aromatic vinyl compound-based polymer block/conjugated diene compound-based polymer block/aromatic vinyl compound-based polymer block, and hydrogenated forms of the foregoing, and specifically there may be mentioned styrene/ethylene-butene/styrene block copolymer (SEBS), styrene/butadiene/styrene block copolymer (SBS), styrene/isoprene/styrene block copolymer (SIS) and styrene/ethylene-propylene/styrene (SEPS) block copolymer.

The (ethylene and/or propylene)/α-olefin-based copolymers, (ethylene and/or propylene)/(α,β-unsaturated carboxylic acid and/or unsaturated carboxylic acid ester)-based copolymers, ionomer polymers and aromatic vinyl compound/conjugated diene compound-based block copolymers used for the (C) impact-resistant material are preferably polymers that have been modified with a carboxylic acid and/or its derivative. Modification with such components will include a functional group with affinity for polyamide resins in the molecule.

The amount of a carboxylic acid and/or its derivative added is in the range of preferably 0.1-10 wt % and more preferably 0.5-5.0 wt % with respect to the weight of the copolymer. A content of at least 0.1 wt % is preferred for better compatibility with polyamide resins and significantly improved impact resistance. A content of no greater than 10 wt % is preferred to provide a notable improving effect on the impact resistance, and good productivity.

The functional group with affinity for polyamide resins may be a carboxylic acid group, acid anhydride group, carboxylic acid ester group, carboxylic acid metal salt, carboxylic acid imide group, carboxylic acid amide group, epoxy group or the like. As examples of compounds with such functional groups there may be mentioned acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, and metal salts of these carboxylic acids, and monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl malate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate, glycidyl citraconate and the like. These may be used either alone or in combinations of two or more. Maleic anhydride is preferred among these mentioned above.

The content of the (C) impact-resistant material is preferably 10-30 wt % with respect to the total polyamide resin composition. A (C) impact-resistant material content of at least 10 wt % is preferred for a greater effect of impact resistance. A content of no greater than 30 wt % is also preferred for improved rigidity and better gas barrier properties.

Depending on the purpose of use, the hydrogen tank liner material of the invention may also contain appropriate amounts of functional agents such as dyes, pigments, reinforcing fibers, reinforcing particles, plasticizers, heat-resistant materials, foaming agents, weather-proofing agents, crystal nucleating agents, crystallization promoters, release agents, lubricants, antistatic agents, flame retardants, flame-retardant auxiliary agents, coloring agents and the like.

There are no particular restrictions on the process for production of the hydrogen tank liner material of the invention, and for example, the following process may be applied.

For mixture of the (A) polyamide 6, (B) copolyamide and (C) impact-resistant material there may be used a single-screw or twin-screw extruder or a Banbury mixer, kneader, mixing roll, or any other commonly known melt kneading apparatus. For example, there may be employed a method of using a twin-screw extruder for mixing and then melt kneading of all of the starting materials, a method of mixing and then melt kneading a portion of the starting materials, and then mixing and melt kneading the remainder of the starting materials, or a method of mixing a portion of the starting materials, and then using a side feeder during subsequent melt kneading for admixture of the remainder of the starting materials.

There are no particular restrictions on the method of molding the hydrogen tank liner from the hydrogen tank liner material of the invention, and production may be accomplished using a common thermoplastic resin molding machine such as an extrusion molding machine, blow molding machine, compression molding machine or injection molding machine.

Notably, since the hydrogen tank liner material of the invention has adequate low-temperature impact resistance and gas barrier properties even as a monolayer, the hydrogen tank liner can be easily produced by monolayer injection molding. A "monolayer" in this case is a molded article layer obtained by filling a cavity with a resin composition melted with a simple plasticizer. Also, the term "injection molding" refers to any form of injection of a molten resin into a die cavity in a pressurized state and solidification in the die to obtain a molded article, and includes ordinary injection molding as well as injection compression molding, for example.

The hydrogen tank liner may also be produced by forming two or more segments for a shaped article by monolayer injection molding and then laser welding the segments together. For example, a barrel-shaped part can be easily produced by forming two separate parts from a center section by injection molding, and then welding them together by laser welding.

In this case, one of the parts is laser permeable while the other part is laser-absorbing, and the laser light is irradiated from the laser-permeable part side to laser weld the parts together.

Instead of the other part being laser-absorbing, its surface may be coated with a laser-absorbing coating material. The laser welding may also be carried out with a laser-absorbing resin sandwiched between the two parts.

Alternatively, the two parts may be colored with coloring agents of the same color to allow joining together of resins of the same color, in order to improve the visual appearance of the joined resin members.

FIG. 1 shows a cross section of a hydrogen tank. In the figure, numerical reference 1 denotes an inner liner of a hydrogen tank and 2 denotes a body of the hydrogen tank.

EXAMPLES

The present invention will now be explained in greater detail by examples and comparative examples, with the understanding that the invention is in no way limited only to the examples.

The methods used to measure the physical properties of the resins and molded articles in the examples and comparative examples were as follows. The temperatures employed were ordinary temperature and the minimum testable temperature.

(1) Tensile Strength and Breakage Elongation:
   Testing was conducted according to ASTMD638, using a 3.2 mm-thick test piece at ordinary temperature (23° C.) and −40° C.
   Testing was also conducted according to JIS K 7161 using a 4 mm-thick tensile test piece at −80° C., conforming to JIS K 7162 1A.

(2) Bending Strength and Flexural Modulus:
   A three-point bending test was conducted according to ASTMD790, using a 6.4 mm-thick test strip at ordinary temperature.

(3) Izod Impact Strength:
   This was evaluated with an Izod impact tester at ordinary temperature (23° C.), −40° C. and −75° C. according to ASTMD256, using a 6.4 mm-thick test strip having a notch formed therein after working.

(4) He Gas Permeability:
   This was measured by the following test method, using a nonstationary permeability meter system by Rika Seiki Co., Ltd.
   Evaluation test sample size: 47 mmΦ (formed to 50 μm with a T-die film-forming machine)
   Cell temperature: 30° C.
   Evaluation gas: Pure helium (99.99995%)
   Supply pressure: 1.0 kgf/cm$^2$ (5) Laser Transmittance:
   This was measured using a Power Energy Analyzer (Field-Master® GS LM-45 by Coherent Japan, Inc.), for a piece molded into an ASTM #1 dumbbell shape.

Polyamide Resins
   PA6: Polyamide 6 (SF1018A by Ube Industries, Ltd.: relative viscosity with 96% sulfuric acid=2.98)
   PA66: Polyamide 66 (2020 by Ube Industries, Ltd.: relative viscosity with 96% sulfuric acid=2.75)
   PA6/66: Polyamide 6/66 resin (5034B by Ube Industries, Ltd.: relative viscosity with 96% sulfuric acid=4.05)

Impact-resistant Material
   EBR: Maleic anhydride-modified EBR (TAFMER MH5020 by Mitsui Chemicals, Inc.:
   density ρ=0.86)

Examples 1-2 and Comparative Examples 1-3

After dry blending the polyamide resins and impact-resistant materials listed in Table 1, they were melt kneaded with a TEX-44 biaxial kneader to produce polyamide resin composition pellets.

The obtained pellets were then injection molded at a cylinder temperature of 280° C. and a mold temperature of 80° C. to produce different test pieces, and the physical properties thereof were evaluated. The results are shown in Table 1.

TABLE 1

|  |  |  | Examples | | Comparative Examples | | |
|---|---|---|---|---|---|---|---|
|  |  |  | 1 | 2 | 1 | 2 | 3 |
| Polyamide resin | PA6 |  | 72.5 | 62.5 | 100.0 | 82.5 |  |
|  | PA66 |  |  |  |  |  | 82.5 |
|  | PA6/66 |  | 10.0 | 20.0 |  |  |  |
| Impact-resistant material | EBR |  | 17.5 | 17.5 |  | 17.5 | 17.5 |
| Tensile breakage elongation | 23° C. | *1 | VG | VG | G | G | G |
|  | −40° C. |  | G | G | P | G | G |
|  | −80° C. |  | G | G | VP | P | P |
| Izod impact strength | 23° C. | *2 | VG | VG | P | VG | VG |
|  | −40° C. |  | G | G | VP | G | G |
|  | −75° C. |  | G | G | VP | P | P |
| Laser transmittance |  | % | 15 | 15 | 60 | 13 | 10 |
| Gas permeability coefficient | 23° C. | *3 | 2.25E−10 | 2.27E−10 | 1.62E−10 | 2.24E−10 | 2.57E−10 |

*1 Tensile breaking elongation
VG: >200% stretching
G: Breakage after sufficient stretching after yield
P: Breakage immediately after yield
VP: Breakage without yield
*2 Izod impact strength
VG: >800 J/m
G: >80 J/m
P: >40 J/m
VP: <40 J/m
*3 Units: [cm$^3$ (STP) cm/(cm$^2$ · s · cmHg)]

Example 3

The composition of Example 1 was used for injection molding of a hydrogen tank liner. The obtained hydrogen tank liner had excellent gas barrier properties.

The invention claimed is:

1. A hydrogen tank liner obtained by molding a material comprising a polyamide resin composition which comprises 85-40 wt % of (A) polyamide 6, 5-30 wt % of (B) a copolyamide and 10-30 wt % of (C) an impact-resistant material, with respect to the total polyamide resin composition.

2. The hydrogen tank liner according to claim 1, wherein the (B) copolyamide is PA6/66.

3. The hydrogen tank liner according to claim 1, wherein the (C) impact-resistant material is an acid-modified ethylene/α-olefin-based copolymer.

4. The hydrogen tank liner according to claim 2, wherein the (C) impact-resistant material is an acid-modified ethylene/α-olefin-based copolymer.

5. The hydrogen tank liner according to claim 1, formed by monolayer injection molding.

6. The hydrogen tank liner according to claim 1, obtained by forming two or more segments for a shaped article by monolayer injection molding and joining the segments together.

7. The hydrogen tank liner according to claim 5, obtained by forming two or more segments for a shaped article by monolayer injection molding and laser welding the segments together.

8. A method for forming a hydrogen tank liner comprising forming a hydrogen tank liner from a polyamide resin composition comprising 85-40 wt % of (A) polyamide 6, 5-30 wt % of (B) a copolyamide and 10-30 wt % of (C) an impact-resistant material, with respect to the total polyamide resin composition.

9. The method according to claim 8, wherein the (B) copolyamide is PA6/66.

10. The method according to claim 8, wherein the (C) impact-resistant material is an acid-modified ethylene/α-olefin-based copolymer.

11. The method according to claim 8, wherein forming is performed by monolayer injection molding.

12. The method according to claim 8, wherein forming is performed by forming two or more segments for a shaped article by monolayer injection molding and joining the segments together.

13. The method according to claim 8, wherein forming is performed by forming two or more segments for a shaped article by monolayer injection molding and laser welding the segments together.

* * * * *